United States Patent
Morris et al.

(10) Patent No.: US 6,493,172 B1
(45) Date of Patent: Dec. 10, 2002

(54) DISTURBANCE REJECTION OF MECHANICAL INTERACTION FOR DUAL-ACTUATOR DISC DRIVES USING ADAPTIVE FEEDFORWARD SERVO

(75) Inventors: John C. Morris, Minneapolis, MN (US); Yi-Ping Hsin, Burnsville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 269 days.

(21) Appl. No.: 09/621,495

(22) Filed: Jul. 21, 2000

Related U.S. Application Data
(60) Provisional application No. 60/145,504, filed on Jul. 23, 1999.

(51) Int. Cl.[7] ............................................. G11B 5/596
(52) U.S. Cl. .................................. 360/77.02; 360/78.12
(58) Field of Search .............................. 360/75, 77.02, 360/78.12, 78.09; 318/560, 561, 562

(56) References Cited

U.S. PATENT DOCUMENTS

| | | | |
|---|---|---|---|
| 4,616,277 A | * 10/1986 | Berti | 318/625 |
| 4,967,293 A | 10/1990 | Aruga et al. | 360/78.12 |
| 5,223,993 A | 6/1993 | Squires et al. | 360/77.08 |
| 5,341,351 A | 8/1994 | Ng | 396/30 |
| 5,343,345 A | 8/1994 | Gilovich | 360/104 |
| 5,548,192 A | 8/1996 | Hanks | 318/560 |
| 5,761,007 A | 6/1998 | Price et al. | 360/106 |
| 5,805,386 A | * 9/1998 | Faris | 360/264.4 |
| 5,949,605 A | * 9/1999 | Lee et al. | 360/77.04 |
| 6,088,187 A | * 7/2000 | Takaishi | 360/78.05 |

FOREIGN PATENT DOCUMENTS

| JP | 03263659 | 11/1991 |
|---|---|---|
| JP | 07098948 | 4/1995 |

* cited by examiner

Primary Examiner—David Hudspeth
Assistant Examiner—K. Wong
(74) Attorney, Agent, or Firm—Joseph R. Kelly; Westman, Champlin & Kelly, P.A.

(57) ABSTRACT

The present invention incorporates an add-on adaptive feedforward controller into the existent track-following servomechanism of a dual-actuator disc drive to suppress the disturbance caused by mechanical interaction of the two actuator assemblies to thereby enhance the positioning accuracy at track following. The control signal fed into the power amplifier of one actuator is also used as the input signal of an adaptive controller in the other one. In an illustrative embodiment, the information is fed into an adaptive LMS filter. The output of the adaptive filter is then used as a feedforward signal to coordinate the head position with the desired track position. By matching the unknown disturbance dynamics with a filtered-x LMS (least mean square) adaptation algorithm, the output of the feedforward controller is able to cancel the disturbance from mechanical interaction, and thereby realizes the necessary fast, accurate head positioning.

20 Claims, 3 Drawing Sheets

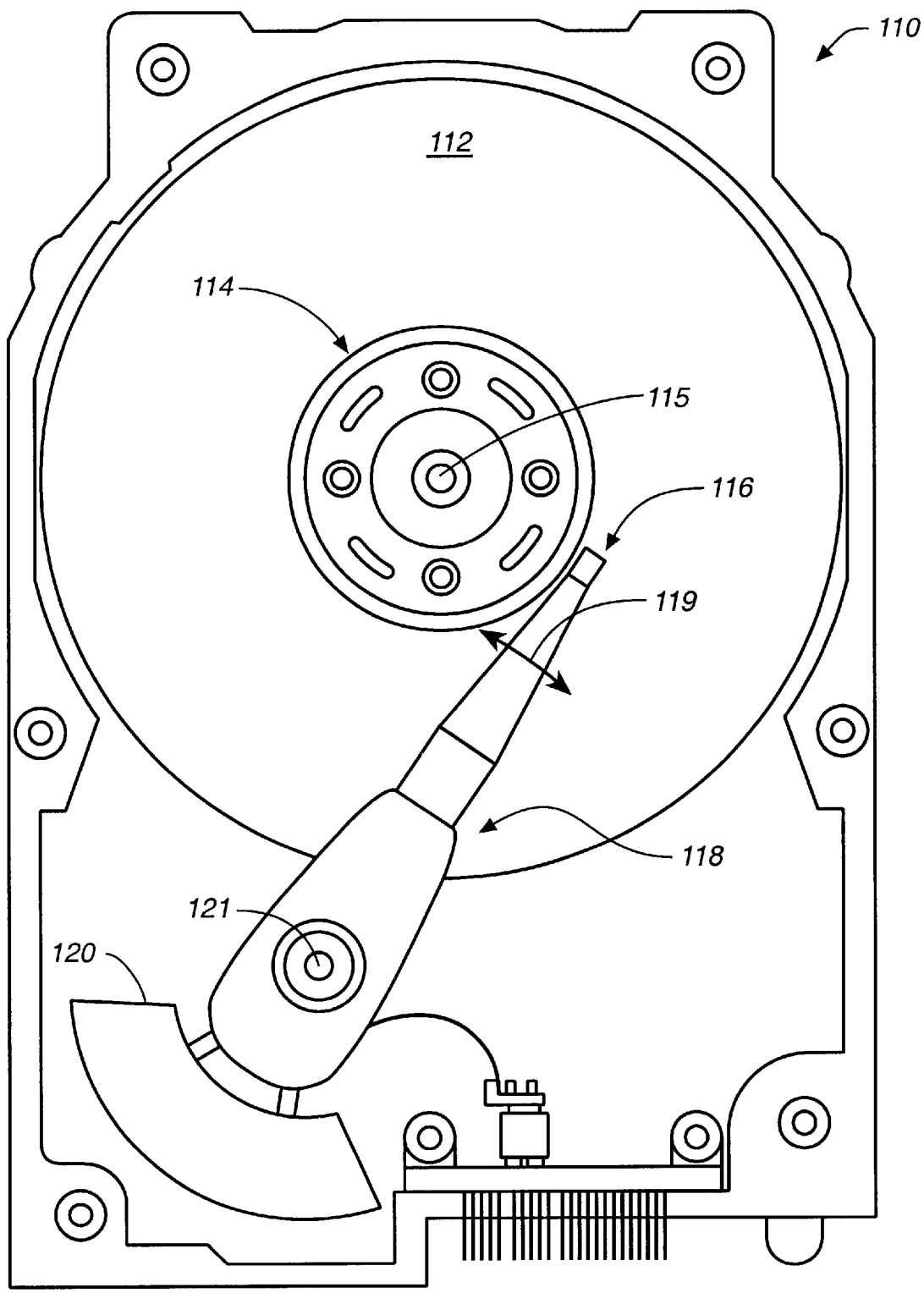
FIG._1

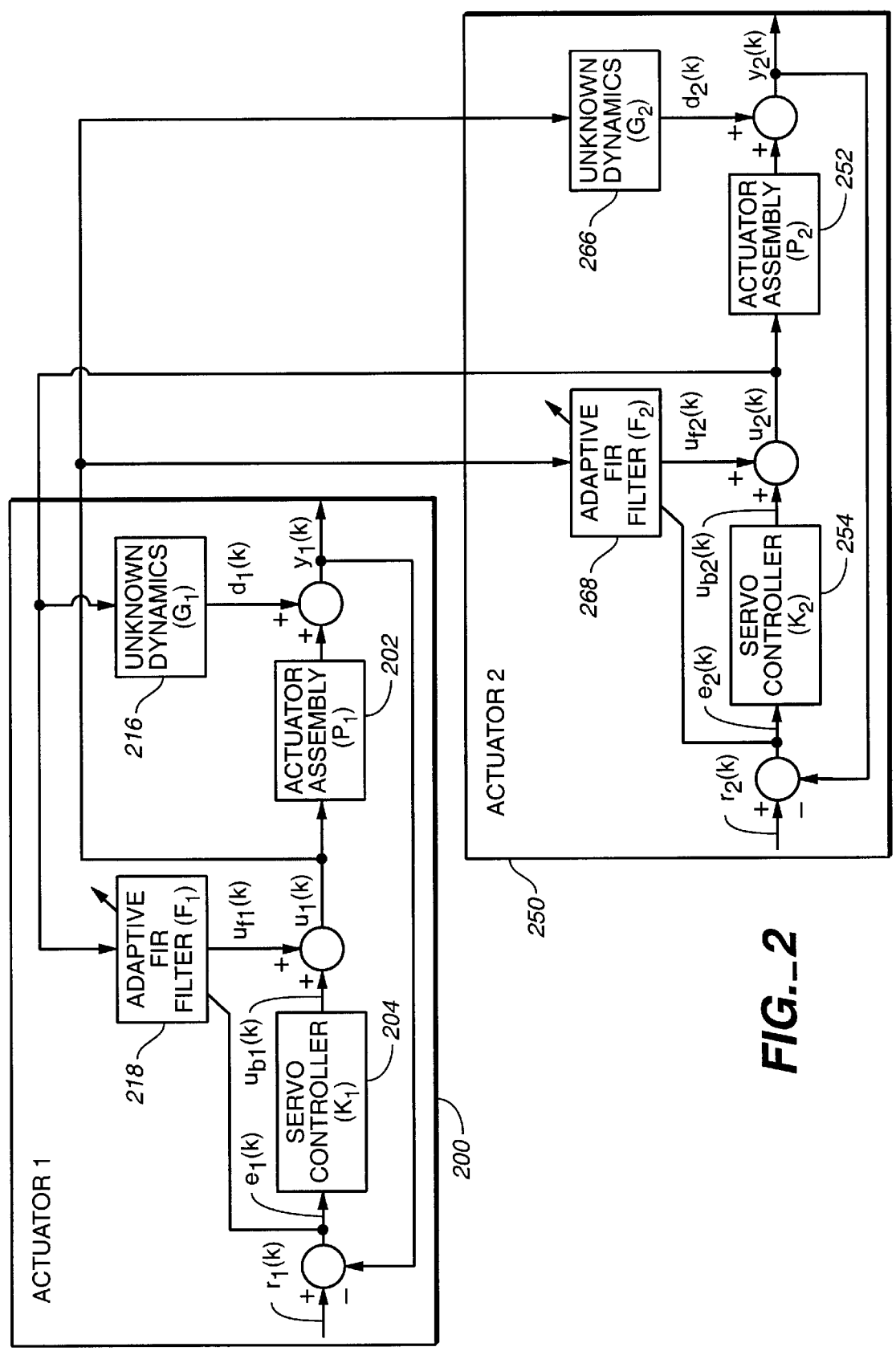
FIG._2

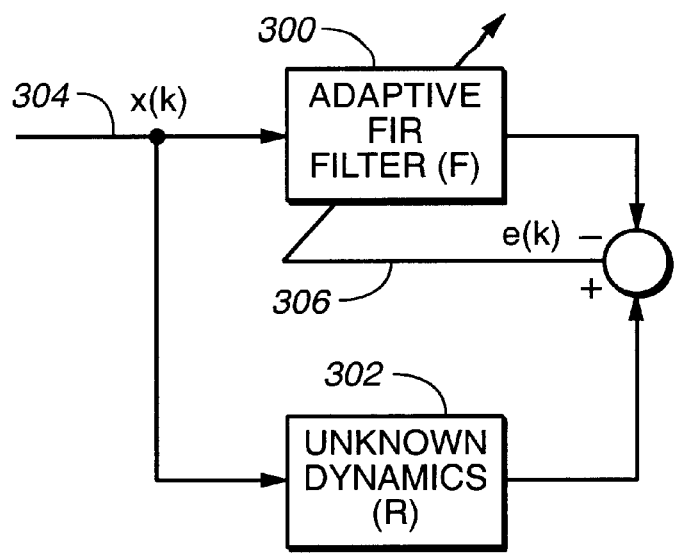

FIG._3

```
PROVIDE THE SECOND SERVO CONTROL
SIGNAL TO ADAPTIVE FILTER THAT PRODUCES
A FEEDFORWARD SIGNAL ADAPTED TO          ─ 400
OFFSET THE DISTURBANCE CAUSED BY
THE MOTION OF THE SECOND ACTUATOR,
THE ADAPTIVE FILTER ADAPTED TO ADJUST
ITS PARAMETERS BASED ON THE SECOND
SERVO CONTROL SIGNAL AND THE PES
```

```
PROVIDE THE FEEDFORWARD SIGNAL TO     ─ 410
THE SERVO LOOP OF THE FIRST ACTUATOR
```

FIG._4

DISTURBANCE REJECTION OF MECHANICAL INTERACTION FOR DUAL-ACTUATOR DISC DRIVES USING ADAPTIVE FEEDFORWARD SERVO

CROSS-REFERENCE TO RELATED APPLICATION

This application claims the benefit of U.S. Provisional Patent Application No. 60/145,504, entitled "DISTURBANCE REJECTION OF MECHANICAL INTERACTION FOR DUAL-ACTUATOR DISK DRIVES BY USING ADAPTIVE FEEDFORWARD SERVO," filed on Jul. 23, 1999.

FIELD OF THE INVENTION

The present invention relates generally to disc drive data storage systems. More particularly, the present invention relates to attenuating the disturbance to the positioning of a read/write head of a first actuator assembly in a dual-actuator disc drive caused by the motion of a second actuator assembly in the drive.

BACKGROUND OF THE INVENTION

Disc drives read and write information along concentric tracks formed on discs. To locate a particular track on a disc, disc drives typically use embedded servo fields on the disc. These embedded fields are utilized by a servo subsystem to position a head over a particular track. The servo fields are written onto the disc when the disc drive is manufactured and are thereafter simply read by the disc drive to determine position. A servo system samples the position of the read/write head relative to a particular track at a particular sampling rate and adjusts the position of the head.

In a typical servo system, the actual position of the read/write head relative to a given track is sensed and compared to the desired position of the head. A position error signal (PES) indicative of the difference between the actual and desired positions is provided to a servo controller. Based on the value of the position error signal, the servo controller provides a servo control signal to a power amplifier that amplifies the servo control signal and provides it to a voice coil motor. The voice coil motor is coupled to an actuator that moves in response to the application of the amplified control signal to the voice coil motor. An actuator arm that holds the read/write head is coupled to the actuator. In this way, the servo controller controls the positioning of the read/write head relative to a particular track on the disc surface.

Magnetics technology has continued to allow for rapid growth in the areal density of disc drives. With the increase in capacity of magnetic disc storage devices used as the main file for large computer systems, fast data access performance is essential. Along with increasing areal density have come faster access times and faster throughput. Each of these technology improvements requires higher performance servo system and mechanical structures. The rotary dual-actuator structure is effective in meeting the high access performance and faster throughput requirement. Two individual channels and actuators are designed to operate simultaneously. However, the dual-actuator structure tends to suffer from the mechanical interaction between actuators when attaining the required head positioning. The motion of one actuator, especially during track seeking, will generate vibrations which will significantly affect the positioning accuracy of the other actuator while track following.

The present invention provides a solution to these and other problems and offers other advantages over the prior art.

SUMMARY OF THE INVENTION

The present invention serves to attenuate the disturbance to the positioning of a read/write head of a first actuator assembly in a dual-actuator disc drive caused by the motion of a second actuator assembly in the drive.

One embodiment of the present invention is directed to a method of attenuating the disturbance to the positioning of a first read/write head, associated with a first actuator assembly, caused by the motion of a second actuator assembly. Pursuant to the method, the servo control signal provided to the second actuator assembly is also provided to an adaptive filter that also receives the position error signal of the first actuator assembly. The adaptive filter then produces a feedforward signal adapted to offset the disturbance to the positioning of the first read/write head caused by motion of the second actuator assembly. The adaptive filter adjusts its parameters based upon the received position error signal and the received servo control signal. The feedforward signal is provided to the servo loop of the first actuator assembly.

Another embodiment of the present invention is directed to a disc drive that includes first and second actuator assemblies, corresponding first and second servo controllers, and an adaptive filter. The first actuator assembly positions a first read/write head relative to a disc surface. The first servo controller receives a first position error signal that is indicative of a difference between the actual position of the first read/write head relative to a disc surface and the desired position of the first read/write head. The first servo controller provides a first servo control signal to the first actuator assembly based on the value of the first position error signal. The second actuator assembly positions a second read/write head relative to a disc surface. The second servo controller receives a second position error signal that is indicative of a difference between the actual position of the second read/write head relative to a disc surface and the desired position of the second read/write head. The second servo controller provides a second servo control signal to the second actuator assembly based on the value of the second position error signal. The adaptive filter receives the second servo control signal and the first position error signal and provides a feedforward signal to the first actuator assembly. The feedforward signal is designed to offset the disturbance to the position of the first read/write head caused by the motion of the second actuator assembly. The adaptive filter adjusts its parameters based upon the second servo control signal and the first position error signal.

These and various other features as well as advantages which characterize the present invention will be apparent upon reading of the following detailed description and review of the associated drawings.

BRIEF DESCRIPTION OF THE DRAWINGS

FIG. 1 is a plan view of a disc drive suitable for use with the present invention.

FIG. 2 is a block diagram of a dual-actuator disc drive servomechanism with an adaptive controller according to an illustrative embodiment of the present invention.

FIG. 3 is a block diagram of the typical LMS adaptive filter scheme.

FIG. 4 is a flow chart representing a method of attenuating the effect of the motion of one actuator on the positioning of another actuator in a dual-actuator drive according to an illustrative embodiment of the present invention.

DETAILED DESCRIPTION OF ILLUSTRATIVE EMBODIMENTS

FIG. 1 is a plan view of a typical disc drive 110. Disc drive 110 includes a disc pack 112, which is mounted on a spindle motor (not shown) by a disc clamp 114. Disc pack 112, in one preferred embodiment, includes a plurality of individual discs which are mounted for co-rotation about a central axis 115. Each disc surface on which data is stored has an associated head-gimbal assembly (HGA) 116 which is mounted to an actuator 118 in disc drive 110. The actuator assembly shown in FIG. 1 is of the type known as a rotary moving coil actuator and includes a voice coil motor shown generally at 120. Voice coil motor 120 rotates actuator 118 with its attached head-gimbal assemblies 116 about a pivot axis 121 to position head-gimbal assemblies 116 over desired data tracks on the associated disc surfaces, under the control of electronic circuitry housed within disc drive 110.

More specifically, actuator 118 pivots about axis 121 to rotate head-gimbal assemblies 116 generally along an arc 119 which causes each head-gimbal assembly 116 to be positioned over a desired one of the tracks on the surfaces of discs in disc pack 112. Head-gimbal assemblies 116 can be moved from tracks lying on the innermost radius, to tracks lying on the outermost radius of the discs. Each head-gimbal assembly 116 has a gimbal which resiliently supports a slider relative to a load beam so that the slider can follow the topography of the disc. The slider, in turn, includes one or more transducers, which are utilized for encoding flux reversals on, and reading flux reversals from, the surface of the disc over which it is flying.

A rotary dual-actuator structure utilizes two individual channels and actuators that are designed to operate simultaneously. The two actuators can be positioned at different circumferential locations relative to the disc pack 112. Alternatively, the actuators can be located at the same circumferential location and be stacked substantially one on top of the other, wherein one actuator is used to access the lower discs in disc pack 112 and the other actuator is used to access the upper discs in disc pack 112. The present invention is described herein with respect to a dual-actuator system. However, it will be appreciated that the present invention will apply to disc drive systems that employ any plural number of actuators.

The present invention incorporates an add-on adaptive feedforward controller into the existent track-following servomechanism to suppress the disturbance caused by mechanical interaction of the two actuator assemblies to thereby enhance the positioning accuracy at track following. The control signal fed into the amplifier of one actuator determines its subsequent motion along with the vibration which causes head positioning disturbance to the other actuator. Therefore, the control signal can be considered correlated with the disturbance of mechanical interaction in the other actuator. The control signal fed into the power amplifier of one actuator is also used as the input signal of an adaptive controller in the other one. In an illustrative embodiment, the information is fed into an adaptive LMS filter. The output of the adaptive filter is then used as a feedforward signal to coordinate the head position with the desired track position. By matching the unknown disturbance dynamics with a filtered-x LMS (least mean square) adaptation algorithm, the output of the feedforward controller is able to cancel the disturbance from mechanical interaction, and thereby realizes the necessary fast, accurate head positioning.

The present invention will be discussed with respect to a single-input, single-output (SISO) discrete time stochastic system. It will be appreciated that the invention is also applicable to other systems. All transfer functions and signals are expressed in the discrete time domain by using the sampling time index, k, and the unit delay operator $q^{-1}$.

FIG. 2 is a block diagram of a dual-actuator disc drive servomechanism with adaptive controllers, according to an illustrative embodiment of the present invention. Two actuators, which have the same servo structure, are grouped by actuator 1 (200) and actuator 2 (250). The notation in two groups shares the same meaning with subscript 1 and 2 respectively. In actuator 1 (200), the actuator assembly model 202 and the existent servo controller 204 are denoted by $P_1$ and $K_1$ respectively. In an illustrative embodiment, actuator assembly model $P_1$ 202 (as well as actuator assembly model $P_2$ 252) includes a digital-to-analog converter (DAC)/power amplifier, a voice coil motor, an actuator and an actuator arm. The actual position $y_1(k)$ of the read/write head relative to a given track is sensed and compared to the desired position $r_1(k)$ of the head. A position error signal (PES) $e_1(k)$ indicative of the difference between the actual and desired positions is provided to servo controller 204. Based on the value of position error signal $e_1(k)$, servo controller 204 (K) provides a servo control signal $u_{b1}(k)$ to the DAC/power amplifier of actuator assembly 202. The DAC/power amplifier converts the digital servo control signal $u_{b1}(k)$ to an analog signal, amplifies the signal and provides it to the voice coil motor. The voice coil motor is coupled to an actuator that moves in response to the application of the amplified control signal to the voice coil motor. An actuator arm that holds the read/write head is coupled to the actuator. In this way, servo controller 204 controls the positioning of the read/write head relative to a particular track on the disc surface.

The head position disturbance $d_1(k)$ is caused by the motion of actuator 2 (250) and assumed to be sourced from the control signal $u_2(k)$ through the unknown dynamics $G_1$ 216. The control signal $u_2(k)$ is also fed into the adaptive FIR filter $F_1$ 218 in order to generate the feedforward signal $u_{f1}(k)$ for canceling the disturbance $d_1(k)$. In the adaptation algorithm of filter $F_1$ 218, both the PES $e_1(k)$ and the control signal $u_2(k)$ are used for FIR parameter tuning. The addition of the feedforward signal $u_{f1}(k)$ and the feedback signal $u_{b1}(k)$ from the existent servo controller 204 is denoted by $u_1(k)$, which is fed into the power amplifier of actuator 1. In an illustrative embodiment, the control signal $u_1(k)$ is treated as the disturbance source and the input signal of feedforward controller 268 in actuator 2 (250), in the same manner as the function of $u_2(k)$ in actuator 1 (200).

In an illustrative embodiment, the adaptive feed forward scheme is identical in both actuators. The following derivation of the adaptive feedforward algorithm for actuator 1 (200) is also appropriate for actuator 2 (250).

From FIG. 1, it can be seen that the auxiliary feedforward signal $u_{f1}(k)$ and the disturbance $d_1(k)$ can be treated as sourcing from the same input $u_2(k)$. Their relationships can be written as $$u_{f1}(k) = F_1(k, q^{-1}) u_2(k) \qquad \text{Eq. (1)}$$

$$d_1(k) = G_1(k, q^{-1}) u_2(k) \qquad \text{Eq. (2)}$$

For the reference input $r_1(k)=0$, the position error signal $e_1(k)$ can be derived as $$e_1(k) = -\frac{1}{1+K_1P_1}d_1(k) - \frac{P_1}{1+K_1P_1}u_{f1}(k) \quad \text{Eq. (3)}$$

Substituting equation (1) and (2) into equation (3), $e_1(k)$ becomes $$e_1(k) = \left(-\frac{G_1}{1+K_1P_1} - \frac{P_1F_1}{1+K_1P_1}\right)u_{f1}(k) \quad \text{Eq. (4)}$$

The first term at the right hand side of equation (4) is the net effect of mechanical interaction from actuator 2 (250) to the head position of actuator 1 (200), and the second term is the disturbance cancellation from the adaptive feedforward scheme. The objective of the adaptive filter $F_1(k,q^{-1})$ in the second term is to approximate the unknown disturbance dynamics in the first term by adjusting its parameters, and then cancel each other for minimum error level. In an illustrative embodiment, a filtered-x LMS adaptive algorithm is hence applied for parameter adaptation of $F_1(k,q^{-1})$ and will be discussed in the following section.

In an illustrative embodiment, the LMS adaptive filter is a tapped delay line with variable coefficients or tap weights driven by the LMS algorithm of Widrow and Hoff. This algorithm is described in *Adaptive Inverse Control,* Bernard Widrow and Eugene Wallach, Prentice Hall, Inc. 1996, which is hereby incorporated by reference. The LMS algorithm is a gradient algorithm based on the method of steepest decent. FIG. 3 is a block diagram of the typical LMS adaptive filter scheme where x(k) 304 is the input signal and e(k) 306 is the modeled error signal. The unknown dynamics 302 is denoted by $R(k,q^{-1})$. The transfer function for an N-tap adaptive FIR filter $F(k,q^{-1})$ takes the form $$F(k,q^{-1})=f_0(k)+f_1(k)q^{-1}+ \ldots +f_{N-1}(k)q^{-(N-1)} \quad \text{Eq. (5)}$$

where the parameters $f_i(k)$, or tap weights, at time k are adjusted on-line via the LMS algorithm.

From FIG. 3, the relationship between the input signal x(k) 304 and the modeled error signal e(k) 306 is derived as $$e(k)=[R(k,q^{-1})-F(k,q^{-1})]x(k) \quad \text{Eq. (6)}$$

The goal of the adaptive FIR filter 300 is using both the input signal 304 and the feedback error signal 306 to adjust the tap weights in order to match the unknown dynamics R and result in minimum mean square error. The update law of tap weights is given by $$f_i(k+1)=f_i(k)+2\mu \cdot e(k)\cdot x(k-i); \text{ for } i=0,1,\ldots,N-1 \quad \text{Eq. (7)}$$

where $\mu$ is a constant gain which determines the convergence rate and minimum error level.

In an illustrative embodiment of the present invention, the modified scheme, filtered-x LMS adaptive algorithm, is employed to fit the block diagram shown in FIG. 3 in order to reach the minimum error level in the adaptive feedforward scheme. This filtered-x scheme is described generally in the Widrow and Wallach work mentioned previously, though that work does not discuss the scheme in relation to disc drives. From FIG. 2, the transfer function $H_1$ between the actual position measurement $y_1(k)$ and the feedforward signal $u_{f1}(k)$ can be derived as $$H_1 = \frac{P_1}{1+K_1P_1} \quad \text{Eq. (8)}$$

Substituting equation (8) into equation (4), $e_1(k)$ can be expressed as $$e_1(k) = \left(-\frac{G_1}{P_1} - F_1\right)H_1u_2(k) \quad \text{Eq. (9)}$$

Comparing equation (9) with equation (6), if the N-tap adaptive FIR filter $F_1$ in equation (9) takes the form $$F_1(k,q^{-1})=f'_0(k)+f'_1(k)q^{-1}+ \ldots +f'_{N-1}(k)q^{-(N-1)} \quad \text{Eq. (10)}$$

and the $x_1(k)$ signal is defined as $$x_1(k)=H_1(k,q^{-1})u_2(k) \quad \text{Eq. (11)}$$

which is available for the parameter update law given by $$f'_i(k+1)=f'_i(k)+2\mu_1 \cdot e_1(k)\cdot x_1(k-i); \text{ for } i=0,1,\ldots,N-1 \quad \text{Eq. (12)}$$

where $\mu_1$ is a constant gain, the adaptive filter $F_1(k,q^{-1})$ will be capable of adjusting its tap weights to trace the unknown dynamics $-G_1/P_1$ and minimize the position error signal caused by the mechanical interaction from actuator 2 (250). In an illustrative embodiment of the present invention, the transfer function $H_1$ is not available on-line. In this case, the plant estimation is made. The frequency response of plant $H_1$ is measured off-line and the a priori estimate $\hat{H}_1$ is then made. The $x_1(k)$ signal used in the update law of tap weights in equation (12) is then available on-line by replacing the transfer function $H_1$ with the plant estimate $\hat{H}_1$ in equation (11) and becomes $$x_1(k)=\hat{H}_1(k,q^{-1})u_2(k) \quad \text{Eq. (13)}$$

The position error signal $e_1(k)$ in equation (9) is also modified to become $$e_1(k) = \left(-\frac{G_1}{P_1} - \frac{\hat{H}_1}{H_1}F_1\right)H_1u_2(k) \quad \text{Eq. (14)}$$

In an alternative embodiment of the present invention, the transfer function $H_1$ is determined on-line in real time by employing a second adaptive filter. However, the typical disc drive servomechanism has limited memory space and limited time to run complicated processes. The filtered-x LMS algorithm is appealing for disc drive applications because it is simple and requires few computations. This is due mainly to the fact that it uses a constant adaptation gain and has no real-time plant identification. Note that using an a priori estimate of $H_1$ may seem to defeat the purpose of the adaptation. However, it has been shown experimentally that even a poor estimate of $H_1$ is generally acceptable. Adaptive Inverse Control, Widrow and Wallach. The condition $\hat{H}_1$ for convergence of the filter-x LMS algorithm is that $\hat{H}_1/H_1$ is strictly positive real.

FIG. 4 is a block diagram representing a method of attenuating the disturbance to the positioning of a first read/write head, associated with a first actuator assembly 202, caused by the motion of a second actuator assembly 252. At step 400, the servo control signal provided to the second actuator assembly is also provided to an adaptive filter 218 that also receives the position error signal of the first actuator assembly 200. The adaptive filter 218 then produces a feedforward signal adapted to offset the disturbance to the positioning of the first read/write head caused by motion of the second actuator assembly 252. The adaptive filter 218 adjusts its parameters based upon the received position error signal and the received servo control signal. The feedforward signal is provided to the servo loop of the first actuator assembly 200.

It will be appreciated that the dual-actuator adaptive feedforward control scheme of the present invention can be utilized with great benefit in a dual-stage servo system that employs microactuators to perform fine adjustments of the read/write heads. Using the adaptive feedforward scheme to attenuate the disturbance caused by another actuator in the drive frees up the microactuator stage of the servo system to accomplish other objectives such as achieving faster seeking.

In summary, one embodiment of the present invention is directed to a disc drive 110 that includes first and second actuator assemblies 202 and 252, corresponding first and second servo controllers 204 and 254, and an adaptive filter 218. The first actuator assembly 202 positions a first read/write head relative to a disc surface. The first servo controller 204 receives a first position error signal $e_1(k)$ that is indicative of a difference between the actual position of the first read/write head relative to a disc surface and the desired position of the first read/write head. The first servo controller 204 provides a first servo control signal $u_{b1}(k)$ to the first actuator assembly 202 based on the value of the first position error signal $e_1(k)$. The second actuator assembly 252 positions a second read/write head relative to a disc surface. The second servo controller 254 receives a second position error signal $e_2(k)$ that is indicative of a difference between the actual position of the second read/write head relative to a disc surface and the desired position of the second read/write head. The second servo controller 254 provides a second servo control signal $u_2(k)$ to the second actuator assembly 252 based on the value of the second position error signal $e_2(k)$. The adaptive filter 218 receives the second servo control signal $u_2(k)$ and the first position error signal $e_1(k)$ and provides a feedforward signal $u_{f1}(k)$ to the first actuator assembly 202. The feedforward signal $u_{f1}(k)$ is designed to offset the disturbance to the position of the first read/write head caused by the motion of the second actuator assembly 252. The adaptive filter 218 adjusts its parameters based upon the second servo control signal $u_2(k)$ and the first position error signal $e_1(k)$.

Another embodiment of the present invention is directed to a method of attenuating the disturbance to the positioning of a first read/write head, associated with a first actuator assembly 202, caused by the motion of a second actuator assembly 252. Pursuant to the method, the servo control signal $u_2(k)$ provided to the second actuator assembly 252 is also provided to a an adaptive filter 218 that also receives the position error signal $e_1(k)$ of the first actuator assembly 200. The adaptive filter 218 then produces a feedforward signal $u_{f1}(k)$ adapted to offset the disturbance to the positioning of the first read/write head caused by motion of the second actuator assembly 252. The adaptive filter 218 adjusts its parameters based upon the received position error signal $e_1(k)$ and the received servo control signal $u_2(k)$. The feedforward signal $u_{f1}(k)$ is provided to the servo loop of the first actuator assembly 200.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the dual-actuator adaptive feedforward scheme while maintaining substantially the same functionality without departing from the scope and spirit of the present invention. In addition, although the preferred embodiment described herein is directed to an adaptive feedforward scheme for a dual-actuator system, it will be appreciated by those skilled in the art that the teachings of the present invention can be applied to systems employing any plural number of actuators, without departing from the scope and spirit of the present invention.

What is claimed is:

1. In a disc drive having at least two actuator assemblies, each adapted to operate in a servo loop to position a read/write head relative to a disc surface, each servo loop adapted to provide a servo control signal to its associated actuator assembly based on a position error signal indicative of a difference between an actual position of the read/write head relative to the disc surface and a desired position of the read/write head, a method of attenuating a disturbance to the positioning of a first read/write head, associated with a first actuator assembly, caused by motion of a second actuator assembly, the method comprising steps of:

(a) providing the servo control signal provided to the second actuator assembly to a first adaptive filter adapted to produce a feedforward signal adapted to offset the disturbance to the positioning of the first read/write head caused by motion of the second actuator assembly, the first adaptive filter having parameters that are adjustable based upon the received servo control signal and the position error signal of the first actuator assembly; and (b) providing the feedforward signal to the servo loop of the first actuator assembly.

2. The method of claim 1 wherein the first adaptive filter is a tapped delay line with variable tap weights.

3. The method of claim 2 wherein the variable tap weights are driven by a least-mean-square algorithm.

4. The method of claim 3 wherein the least-mean-square algorithm is a gradient algorithm based on the method of steepest descent.

5. The method of claim 4 wherein the transfer function F of the adaptive filter is $$F(k,q^{-1}) = f_0(k) + f_1(k)q^{-1} + \ldots + f_{N-1}(k)q^{-(N-1)}$$

where $q^{-1}$ is a unit delay operator and the tap weights $f_i(k)$ at time k are adjusted on-line via the least-mean-square algorithm.

6. The method of claim 5 wherein the tap weights are updated as follows:

$$f_i(k+1) = f_i(k) + 2\mu \cdot e(k) \cdot x(k-i); \text{ for } i=0,1,\ldots,N-1$$

where e(k) is the difference between the feedforward signal and the actual disturbance caused by the motion of the second actuator assembly, x(k) is the input to the adaptive filter, and $\mu$ is a constant gain which determines the convergence rate and minimum error level.

7. The method of claim 6 wherein the input x(k) to the adaptive filter is $$x_1(k) = H_1(k,q^{-1})u_2(k)$$

where $u_2(k)$ is the servo control signal applied to the second actuator assembly and $H_1(k,q^{-1})$ is the transfer function relating the feedforward signal to an actual position signal indicative of the actual position of the first read/write head relative to the disc surface.

8. The method of claim 6 wherein $$e_1(k) = \left(-\frac{G_1}{P_1} - F_1\right) H_1 u_2(k)$$

where $u_2(k)$ is the servo control signal applied to the second actuator assembly, $G_1$ is the unknown dynamics caused by the motion of the second actuator assembly, $P_1$ is the dynamics of the first actuator assembly, and $H_1$ is a transfer function relating the feedforward signal to an actual position signal indicative of the actual position of the first read/write head relative to the disc surface.

9. The method of claim 1 further comprising steps of:
(c) providing the servo control signal provided to the first actuator assembly to a second adaptive filter adapted to produce a second feedforward signal adapted to offset the disturbance to the positioning of the second read/write head caused by motion of the first actuator assembly, the second adaptive filter having parameters that are adjustable based upon the received servo control signal and the position error signal of the second actuator assembly; and
(d) providing the second feedforward signal to the servo loop of the second actuator assembly.

10. A disc drive comprising:
a first actuator assembly adapted to position a first read/write head relative to a disc surface based on a first position error signal indicative of a difference between an actual position of the first read/write head relative to a disc surface and a desired position of the first read/write head;
a second actuator assembly adapted to receive a second servo control signal and to position a second read/write head relative to a disc surface in response to the second servo control signal; and
a first adaptive filter adapted to receive the second servo control signal and the first position error signal and to provide a feedforward signal to the first actuator assembly, the feedforward signal adapted to offset a disturbance to the position of the first read/write head caused by the second actuator assembly, the first adaptive filter having parameters that are adjustable based upon the second servo control signal and the first position error signal.

11. The disc drive of claim 10 wherein the feedforward signal is added to the first servo control signal.

12. The disc drive of claim 10 wherein the adaptive filter is a tapped delay line with variable tap weights.

13. The disc drive of claim 12 wherein the variable tap weights are driven by a least-mean-square algorithm.

14. The disc drive of claim 13 wherein the least-mean-square algorithm is a gradient algorithm based on the method of steepest descent.

15. The disc drive of claim 14 wherein the transfer function F of the first adaptive filter is $$F(k,q^{-1}) = f_0(k) + f_1(k)q^{-1} + \ldots + f_{N-1}(k)q^{-(N-1)}$$

where $q^{-1}$ is a unit delay operator and the tap weights $f_i(k)$ at time k are adjusted on-line via the least-mean-square algorithm.

16. The disc drive of claim 15 wherein the tap weights are updated as follows:

$$f_i(k+1) = f_i(k) + 2\mu \cdot e(k) \cdot x(k-i); \text{ for } i=0,1,\ldots,N-1$$

where e(k) is the difference between the feedforward signal and the actual disturbance caused by the motion of the second actuator assembly, x(k) is the input to the first adaptive filter, and $\mu$ is a constant gain which determines the convergence rate and minimum error level.

17. The disc drive of claim 16 wherein the input x(k) to the first adaptive filter is $$x_1(k) = H_1(k,q^{-1}) u_2(k)$$

where $u_2(k)$ is the second servo control signal applied to the second actuator assembly and $H_1(k,q^{-1})$ is a transfer function relating the feedforward signal to an actual position signal indicative of the actual position of the first read/write head relative to the disc surface.

18. The disc drive of claim 16 wherein $$e_1(k) = \left(-\frac{G_1}{P_1} - F_1\right) H_1 u_2(k)$$

where $u_2(k)$ is the second servo control signal applied to the second actuator assembly, $G_1$ is the unknown dynamics caused by the motion of the second actuator assembly, $P_1$ is the dynamics of the first actuator assembly, and $H_1$ is a transfer function relating the feedforward signal to an actual position signal indicative of the actual position of the first read/write head relative to the disc surface.

19. The disc drive of claim 10 wherein the first actuator assembly is adapted to receive a first servo control signal based on the first position error signal and to position the first read/write head in response to the first servo control signal, and wherein the second servo control signal is based on a second position error signal indicative of a difference between an actual position of the second read/write head relative to the disc surface and a desired position of the second read/write head, the disc drive further comprising:
a second adaptive filter adapted to receive the first servo control signal and the second position error signal and to provide a second feedforward signal to the second actuator assembly, the second feedforward signal adapted to offset a disturbance to the position of the second read/write head caused by motion of the first actuator assembly, the second adaptive filter having parameters that are adjustable based upon the first servo control signal and the second position error signal.

20. A disc drive comprising:
first and second actuators adapted to position first and second read/write heads respectively relative to a disc surface; and
means for attenuating effects of motion of the second actuator on positioning of the first read/write head by the first actuator.

* * * * *